United States Patent Office 3,706,779
Patented Dec. 19, 1972

3,706,779
PROCESS FOR PREPARING 4-CYANOCYCLO-
HEXANE CARBOXYLIC ACID
Saburo Nabeta, Chibuashi, and Yuzo Yamada and Itsuya
Ito, Tokyo, Japan, assignors to Daiichi Seiyaku Co.,
Ltd., Tokyo, Japan
No Drawing. Filed Sept. 10, 1970, Ser. No. 71,265
Claims priority, application Japan, Sept. 12, 1969,
44/72,374
Int. Cl. C07c *121/10, 121/46*
U.S. Cl. 260—464　　　　　　　　　　　　　2 Claims

ABSTRACT OF THE DISCLOSURE

A process for preparing 4-cyanocyclohexane carboxylic acid which comprises contacting hexahydroterephthalic acid or a mixture of hexahydroterephthalic acid and 1,4-dicyanocyclohexane with ammonia gas, wherein the reaction temperature is from 270° C. to 340° C.

BACKGROUND OF THE INVENTION

Field of the invention

This invention relates to a process for preparing 4-cyanocyclohexane carboxylic acid. More specifically, it relates to a new method for preparing 4-cyanocyclohexane carboxylic acid (hereinafter called 4–CCA) from hexahydroterephthalic acid (hereinafter called HTA):

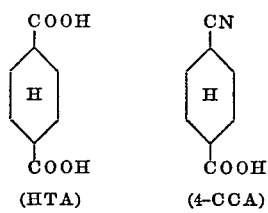

4–CCA is a highly useful compound as a raw material for drug compositions, polymers, or as intermediates in the prepartion of medicinal or polymeric materials.

Description of prior art

4–CCA is conventionally manufactured by esterifying HTA to its hemiester, converting the hemiester to the monoamide with ammonia, and then dehydrating the monoamide with a dehydrant to yield 4–CCA. See, for example, the method disclosed in Japanese Patent publication No. 14,210/1968. Another conventional method for preparing 4–CCA consists of converting the hemiester of HTA (i.e., monomethyl hexahydroterephthalate) to its monoester acid chloride, treating the resultant with aqueous ammonia to produce the corresponding monoester-monoamide, and then dehydrating the resulting to produce the ester of 4–CCA. See, for example, Irish patent publication No. 1,292/1964. All of these conventional methods, however, have several distinct disadvantages from the viewpoint of industrial performance. For instance, these conventional techniques are very long and complicated and require expensive dehydrating reagents, such as phosphorus pentoxide.

SUMMARY OF THE INVENTION

Accordingly, one object of the present invention is to provide a novel and advantageous process for the manufacture of 4–CCA from HTA in a single step.

This, and other objects, have now herein been attained by the direct process of forming 4–CCA by introducing ammonia gas into a melt of HTA.

DESCRIPTION OF PREFERRED EMBODIMENTS

In accordance with the present invention, a melt of HTA is treated with ammonia gas preferably at a temperature of from 270° C. to 340° C. The desired result can be attained without the addition of any catalyst. It has been found that the reaction product will contain 1,4-dicyanocyclohexane (hereinafter called 1,4–CSS), and unreacted material HTA, in addition to 4–CCA. Accordingly, in order to obtain the highest yield of 4–CCA, it is desirable to maintain the reaction conditions such that equilibrium between the 4–CCA, and 1,4–DCC and HTA will occur. At equilibrium the molar proportion of the 4–CCA, the 1,4–DCC and HTA will be 5:4:1 to 5:2.5:2.5. In order to accomplish this result, the reaction temperature should be between 270° C. and 340° C., and most preferably 300° C. and 320° C. The amount of ammonia gas introduced to the reactants should theoretically be sufficient to provide an equimolar amount compared to HTA. In order to maintain an acceptable reaction rate of the ammonia gas with the HTA, which acts as a dibasic acid, the ammonia should be introduced in amounts of from 1.5 to 4.0 times the molar equivalent amount of HTA. When ammonia gas is introduced in too great a velocity, the loss of ammonia gas will increase. Hence the introduction of ammonia gas should be controlled to such an extent that the 1.5 to 4.0 times molar equivalent amount based on the HTA is added over a period of from 1.5 to 2 hours. In order to complete the reaction, it is desirable to maintain the reaction mixture at the reaction temperature for about an additional 30 minutes after introduction of the ammonia gas. The equilibrium conditions can be obtained with either HTA alone or with a mixture of HTA and 1,4–DCC as the starting material.

One advantage of the present invention is the fact that the by-product, 1,4–DCC, may be recycled and used as an additional reactant with HTA. It is believed that one of the cyano groups of the 1,4–DCC will be exchanged for one of the carboxyl groups of the HTA under the reaction conditions. oT obtain the desired equilibrium conditions, it is preferable that the molar ratio of HTA to 1,4–DCC be about 6:4.

It is possible, therefore, to provide a continuous process for the preparation of 4–CCA in quantitative amount, by continuously supplying HTA and continuously recycling the by-product, 1,4–DCC, to be reused as a reactant. The HTA used in the present reaction may be either the trans-form, cis-form, or a mixture of both forms in various ratios (commercial HTA produced by hydrogenation of terephthalic acid usually contains 1 to 1.2 composite ratio of cis-form:trans-form). When the mixture is used, the composite ratio (cis-form/trans-form) is usually from 0.7 to 0.8, which is not influenced by the composite ratio (cis-form/trans-form) of the HTA used. The 1,4–DCC likewise can be used in either trans or cis-form or a mixture of trans and cis-forms.

In order to separate 4–CCA from the reaction mixture, the reaction products are dissolved in water or ammonia water and adjusted to a pH of 6–7 with a sodium hydroxide solution. The product is then extracted with 1,2-dichloroethane to recover 1,4–DCC. The aqueous layer is acidified with mineral acid and again extracted with 1,2-dichloroethane to obtain 4–CCA. In order to recover 1,4–DCC, the reaction product may be dissolved in 1,2-dichloroethane and extracted with an aqueous ammonia solution to provide a mixture of 4–CCA and HTA. The 4–CCA can then be separated from the mixture with 1,2-dichloroethane by extraction with 1,2-dichloroethane in an acidic medium. Although 1,2-dichloroetahne has been mentioned as a suitable solvent for the separation of the product, other solvents can equally be used such as 1,2-dichloropropane, or methylene chloride. The 4-CCA obtained by extraction can then be further purified by recrystallization from water, if necessary.

Having generally described the invention, a further understanding can now be attained by reference to certain specific examples which are provided herein for purposes of illustration.

EXAMPLE 1

About 34.4 g. (0.2 mole) of trans-hexahydroterephthalic acid was melted at 310–320° C. Ammonia gas was introduced to this melt at a velocity of 0.3 mole/hr. for about an hour. After introduction of ammonia gas the reaction mixture was retained at reaction temperature for 30 minutes. After cooling, the reaction product (4-cyanocyclohexane carboxylic acid:1,4-dicyanocyclohexane:hexahydroterephthalic acid=48.5:41.9:11.9) was dissolved in 100 ml. of 1,2-dichloroethane and extracted 5 times with the same volume of 5% ammonia aqueous solution. The solvent was distilled from the 1,2-dichloroethane solution to recover 11.2 g. of 1,4-dicyanocyclohexane. The ammonia aqueous solution was concentrated to dryness in vacuo at about 50° C. and the residue was dissolved in 80 ml. of water. To the solution, about 12 ml. of concentrated hydrochloric acid was added to make the pH 1.0–1.5. The solution was again extracted 5 times with 100 ml. of 1,2-dichloroethane. The solvent was distilled from the extracted solution to provide crude 12.9 g. of 4-cyanocyclohexane carboxylic acid. The resulting crystals precipitated from the aqueous layer were collected by filtration to recover 5.0 g. of hexahydroterephthalic acid.

EXAMPLE 2

About 34.4 g. (0.2 mole) of hexahydroterephthalic acid consisting of cis- and trans-forms was melted at 300–310° C. Ammonia gas was introduced to this melt at a velocity of 0.32 mole/hr. for about 2 hours. After introduction of the ammonia gas the reaction mixture was kept for an additional 30 minutes at the reaction temperature. After cooling, the reaction product (4-cyanocyclohexane carboxylic acid:1,4-dicyanocyclohexane:hexahydroterephthalic acid=48.2:39.3:8.1) was dissolved in 100 ml. of 10% sodium hydroxide aqueous solution. The solution was extracted 5 times with the same volume of 1,2-dichloropropane and the solvent was distilled from the 1,2-dichloropropane solution to recover 10.4 g. of 1,4-dicyanocyclohexane. To the aqueous layer, about 12 ml. of concentrated hydrochloric acid was added to make the pH 1.0–1.5. The solution was again extracted 5 times with 100 ml. of 1,2-dichloropropane. The extracted solution was collected and the solvent was distilled to obtain 14.5 g. of crude 4-cyanocyclohexane carboxylic acid (yield for starting material practically spent=90.3%). The resulting crystals precipitated from the aqueous layer were collected by filtration to recover 2.8 g. of hexahydroterephthalic acid.

EXAMPLE 3

A mixture of 20.0 g. of hexahydroterephthalic acid consisting of cis- and trans-forms and 14.1 g. of recovered 1,4-dicyanocyclohexane was melted at 300–310° C. and ammonia gas was introduced to this mixture at a velocity of 0.32 mole/hr. for about half an hour. After introduction of the ammonia gas, the reaction mixture was maintained for 30 minutes at the reaction temperature. After cooling, the reaction mixture (4-cyanocyclohexane carboxylic acid:1,4 - dicyanocyclohexane:hexahydroterephthalic acid=52.9:36.7:9.6) was dissolved in 10 ml. of 10% ammonia aqueous solution and the solution was extracted 5 times with 100 ml. of 1,2-dichloroethane. The solvent was distilled from the 1,2-dichloroethane solution to recover 9.7 g. of 1,4-dicyanocyclohexane, which was reused as a starting material. To the aqueous solution, about 13 ml. of concentrated hydrochloric acid was added to make the pH 1.0–1.5. The solution was again extracted 5 times with 100 ml. of 1,2-dichloroethane. The extracted solution was collected and the solvent was distilled from the solution to obtain 15.5 g. of 4-cyanocyclohexane carboxylic acid (yield for starting material practically spent=91.3%). The resulting crystals precipitated from the aqueous layer were collected by filtration to recover 2.9 g. of hexahydroterephthalic acid, which was reused as a starting material.

EXAMPLE 4

A mixture of 22.7 g. of hexahydroterephthalic acid consisting of cis- and trans-forms and 9.7 g. of recovered 1,4-dicyanocyclohexane was melted at 300–310° C. and ammonia gas was introduced to this mixture at a velocity of 0.2 mole/hr. for about 2 hours. After introduction of ammonia gas, the reaction mixture was maintained for 30 minutes at the reaction temperature to complete the reaction. After cooling, the reaction product (4-cyanocyclohexane carboxylic acid:1,4 - dicyanocyclohexane: hexahydroterephthalic acid=51.8:28.7:19.6) was dissolved in 100 ml. of 5% $NH_3$ aqueous solution and extracted 5 times with 100 ml. of 1,2-dichloroethane. The solvent was distilled from the 1,2-dichloroethane solution to recover 7.5 g. of 1,4-dicyanocyclohexane which was reused as a starting material. To the aqueous layer, about 7 ml. of concentrated hydrochloric acid was added to make the pH 1.0–1.5 and the solution was again extracted 5 times with 100 ml. of 1,2-dichloroethane. The extracted solution was collected and the solvent was distilled to obtain crude 15.2 g. of 4-cyanocyclohexane carboxylic acid (yield calculated from starting material practically spent=94%). The resulting crystals from the aqueous layer were collected by filtration to recover 5.9 g. of hexahydroterephthalic acid, which was reused as a starting material.

Having now fully described the invention, it will be apparent to one of ordinary skill in the art that many changes and modifications can be made thereto without departing from the spirit and scope of the invention.

Accordingly, what is intended to be secured by Letters Patent is:

1. A process for preparing 4-cyanocyclohexane carboxylic acid which comprises contacting a melt of hexahydroterephthalic acid or a mixture of hexahydroterephthalic acid and 1,4-dicyanocyclohexane with at least an equimolar amount of ammonia gas based on the hexahydroterephthalic acid or said mixture, at a temperature of from 270° C. to 340° C.

2. The process of claim 1 wherein the ammonia is introduced to the reaction in an amount of from 1.5 to 4 times the molar equivalent amount based on the moles of hexahydroterephthalic acid.

References Cited

UNITED STATES PATENTS 3,341,567   9/1967   Yasui et al. _____ 260—465.8

OTHER REFERENCES

Okano et al.: C. A. 70, Mar. 3, 1969, 37293u.

JOSEPH P. BRUST, Primary Examiner